(12) United States Patent
Prager et al.

(10) Patent No.: US 6,522,108 B2
(45) Date of Patent: Feb. 18, 2003

(54) LOSS AND NOISE REDUCTION IN POWER CONVERTERS

(75) Inventors: Jay Prager, Groton, MA (US); Patrizio Vinciarelli, Boston, MA (US)

(73) Assignee: VLT Corporation, San Antonio, TX (US)

(*) Notice: Subject to any disclaimer, the term of this patent is extended or adjusted under 35 U.S.C. 154(b) by 0 days.

(21) Appl. No.: 09/834,750

(22) Filed: Apr. 13, 2001

(65) Prior Publication Data

US 2002/0149348 A1 Oct. 17, 2002

(51) Int. Cl.⁷ .................................................. G05F 1/56
(52) U.S. Cl. ........................................................ 323/222
(58) Field of Search ................................ 323/220, 222, 323/282; 363/39, 50, 59, 60

(56) References Cited

U.S. PATENT DOCUMENTS

| | | |
|---|---|---|
| 3,119,972 A | 1/1964 | Fischman |
| 3,259,829 A | 7/1966 | Feth |
| 3,529,228 A | 9/1970 | Cordy |
| 3,543,130 A | 11/1970 | Reijnders |
| 3,582,754 A | 6/1971 | Hoffmann |
| 3,621,362 A | 11/1971 | Schwarz |
| 3,663,940 A | 5/1972 | Schwarz |
| 3,953,779 A | 4/1976 | Schwarz |
| 4,007,413 A | 2/1977 | Fisher et al. |
| 4,017,784 A | 4/1977 | Simmons et al. |
| 4,024,453 A | 5/1977 | Corry |
| 4,138,715 A | 2/1979 | Miller |
| 4,158,881 A | 6/1979 | Simmons et al. |
| 4,318,164 A | 3/1982 | Onodera et al. |
| 4,415,959 A | 11/1983 | Vinciarelli |
| 5,229,707 A * | 7/1993 | Szepesi et al. .............. 323/222 |
| 5,568,041 A * | 10/1996 | Hesterman .................. 323/907 |
| 5,841,268 A * | 11/1998 | Mednik ....................... 323/222 |
| 5,977,754 A * | 11/1999 | Cross ........................... 323/222 |

FOREIGN PATENT DOCUMENTS

| | | |
|---|---|---|
| DE | 2218055 | 10/1973 |
| DE | 2756773 | 7/1978 |
| DE | 2756799 | 6/1979 |

OTHER PUBLICATIONS

Memoirs of the Faculty of Engineering, Kobe University, No. 22, pp. 99–111, Mar. 1976.

* cited by examiner

*Primary Examiner*—Adolf Deneke Berhane
(74) *Attorney, Agent, or Firm*—Fish & Richardson P.C.

(57) ABSTRACT

An apparatus includes (a) switching power conversion circuitry including an inductive element connected to deliver energy via a unidirectional conducting device from an input source to a load during a succession of power conversion cycles, and circuit capacitance that can resonate with the inductive element during a portion of the power conversion cycles to cause a parasitic oscillation, and (b) clamp circuitry connected to trap energy in the inductive element and reduce the parasitic oscillation.

29 Claims, 6 Drawing Sheets

LOSS AND NOISE REDUCTION IN POWER CONVERTERS

BACKGROUND

This invention relates to reducing energy loss and noise in power converters.

As shown in FIGS. 1 and 2, in a typical PWM non-isolated DC-to-DC shunt boost converter 20 operated in a discontinuous mode, for example, power is processed in each of a succession of power conversion cycles 10. During a power delivery period 12 of each power conversion cycle 10, while a switch 22 is open, power received at an input voltage Vin from a unipolar input voltage source 26 is passed forward as a current that flows from an input inductor 21 through a diode 24 to a unipolar load (not shown) at a voltage Vout. Vout is higher than the input voltage, Vin.

FIGS. 2A and 2B show waveforms for an ideal converter in which there are no parasitic capacitances or inductances and in which the diode 24 has zero reverse recovery time. During the power delivery period 12, the current in the inductor falls linearly and reaches a value of zero at time tcross. At tcross, the ideal diode immediately switches off, preventing current from flowing back from the load towards the input source, and the current in the inductor remains at zero until the switch 22 is closed again at the next time ts1off. Thus, no energy is stored in the inductor 21 between times tcross and ts1on.

During another, shunt period 14 of each cycle, while switch 22 is closed, the voltage at the left side of the diode (node 23) is grounded, and no current flows in the diode. Instead, a shunt current (Is) is conducted from the source 26 into the inductor 21 via the closed switch 22. In a circuit with ideal components, the current in the inductor would begin at zero and rise linearly to time ts1off, when switch 22 is turned off to start another power delivery period 12.

In a non-ideal converter, in which there are parasitic circuit capacitances and the diode is non-ideal (e.g., for a bipolar diode there will be a reverse recovery period and for a Schottky diode there will be diode capacitance), an oscillatory ringing will occur after tcross.

In one example, waveforms for a non-ideal converter of the kind shown in FIG. 1 are shown in FIGS. 2C and 2D. Because of the reverse recovery characteristic of the diode, the diode does not block reverse current flow at time tcross. Instead, current flows in the reverse direction through the diode 24 and back into the inductor 21 during a period 18. At time tdoff, the diode snaps fully off and the flow of reverse current in the diode goes to zero.

Because of the reverse flow of current in the diode during the diode recovery period, energy has been stored in the inductor as of the off time tdoff (the "recovery energy"). In addition, parasitic circuit capacitances (e.g., the parasitic capacitances of the switch 22, the diode 24, and the inductor 24, not shown) also store energy as of time tdoff (e.g., the parasitic capacitance of switch 22 will be charged to a voltage approximately equal to Vout).

After time tdoff, energy is exchanged between the inductor and parasitic capacitances in the circuit. As shown in FIGS. 2C and 2D, the energy exchange causes oscillatory ringing noise in the circuit. Furthermore, the presence of oscillatory current will generally result in energy being dissipated wastefully in the circuit at the start of the next shunt period when the switch is closed at time ts1on. The energy loss can amount to several percent of the total energy processed during a cycle.

SUMMARY

In general, in one aspect, the invention features apparatus that includes (a) switching power conversion circuitry including an inductive element connected to deliver energy via a unidirectional conducting device from an input source to a load during a succession of power conversion cycles, and circuit capacitance that can resonate with the inductive element during a portion of the power conversion cycles to cause a parasitic oscillation, and (b) clamp circuitry connected to trap energy in the inductive element and reduce the parasitic oscillation.

Implementations of the invention may include one or more of the following. The power conversion circuitry comprises a unipolar, non-isolated boost converter comprising a shunt switch. The power conversion circuitry is operated in a discontinuous mode. The clamp circuitry is configured to trap the energy in the inductor in a manner that is essentially non-dissipative. The clamp circuitry comprises elements configured to trap the energy by short-circuiting the inductor during a controlled time period. The inductive element comprises a choke or a transformer. The elements comprise a second switch connected effectively in parallel with the inductor. The second switch is connected directly in parallel with the inductor or is inductively coupled in parallel with the inductor. The second switch comprises a field effect transistor in series with a diode.

The power conversion circuitry comprises a unipolar, non-isolated boost converter comprising a shunt switch and a switch controller, the switch controller being configured to control the timing of a power delivery period during which the shunt switch is open and a shunt period during which the shunt switch is closed.

The shunt switch is controlled to cause the power conversion to occur in a discontinuous mode. The second switch is opened for a period before the shunt switch is closed in order to discharge parasitic capacitances in the apparatus. The power conversion circuitry comprises at least one of a unipolar, isolated, single-ended forward converter, a buck converter, a flyback converter, a zero-current switching converter, a PWM converter, a bipolar, non-isolated, boost converter, a bipolar, non-isolated boost converter, a bipolar, non-isolated buck converter, a bipolar, isolated boost converter, or a bipolar, isolated buck converter.

In general, in another aspect, the invention features, a method that reduces parasitic oscillations by trapping energy in the inductive element during a portion of the power conversion cycles.

Implementations of the invention include releasing the energy from the inductor essentially non-dissipatively. The energy is trapped by short-circuiting the inductive element during a controlled time period. The short-circuiting is done by a second switch connected effectively in parallel with the inductive element. The second switch is opened for a portion of the power conversion cycle in order to discharge parasitic capacitances. The invention reduces undesirable ringing noise generated in a power converter by oscillatory transfer of energy between inductive and capacitive elements in the converter and recycles this energy to reduce or eliminate the dissipative loss of energy associated with turn-on of a switching element in the converter.

Other advantages and features will become apparent from the following description and from the claims.

DESCRIPTION

FIGS. 9A, 9B, 9C, and 9D show isolated, single-ended converters which comprise a clamp circuit.

Figure 1:
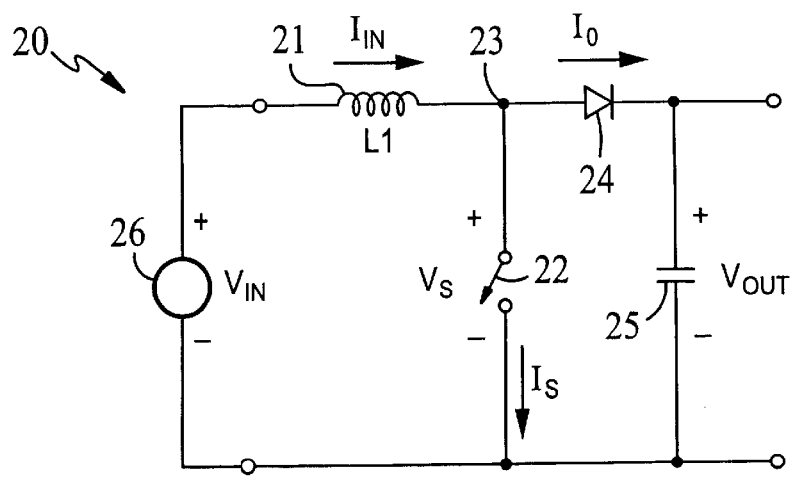
FIG. 1 shows a power conversion circuit.
Figure 2A:
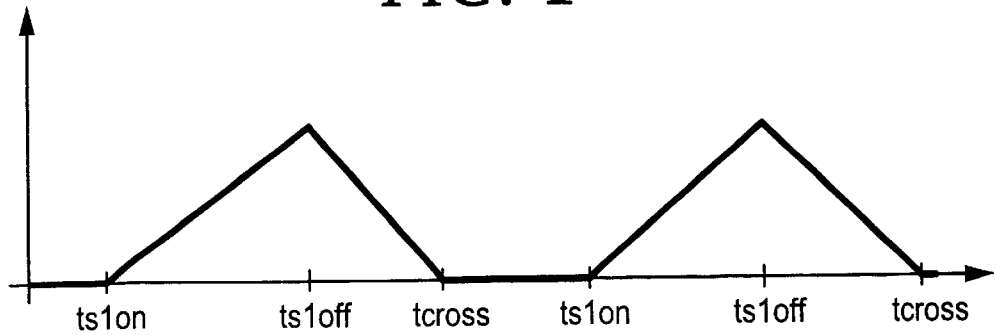
FIGS. 2A–2D shows timing diagrams.
Figure 2B:
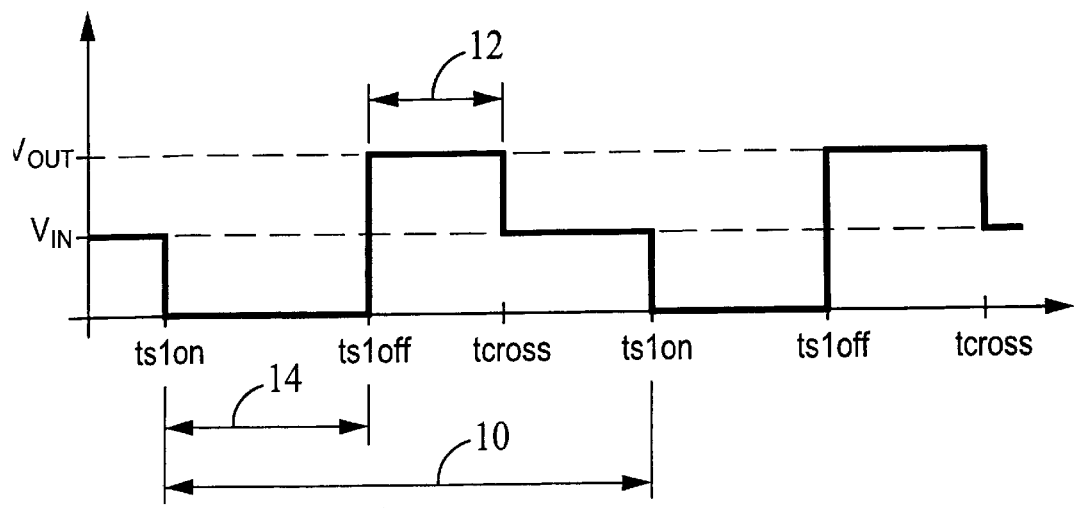
Figure 2C:
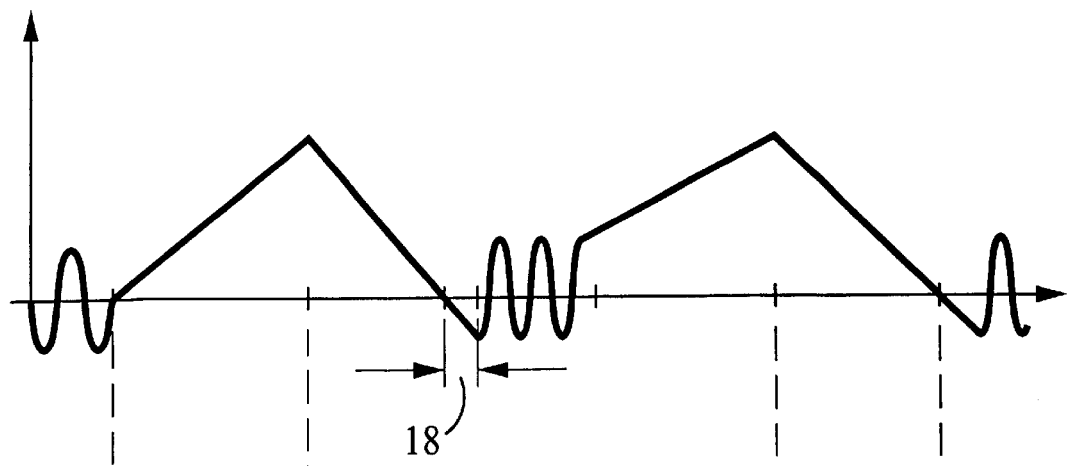
Figure 2D:
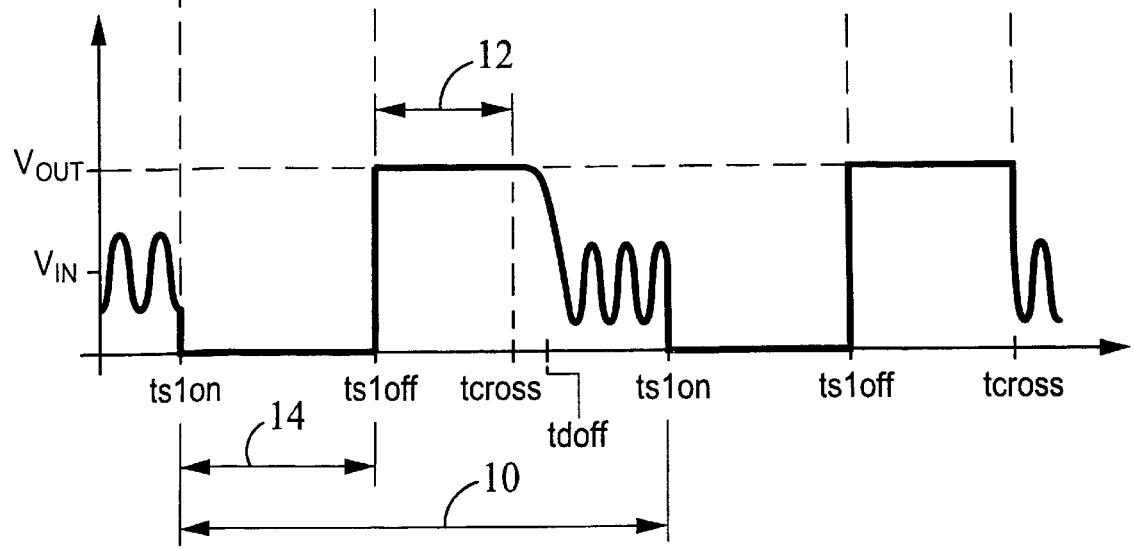

With reference to FIGS. 1, 2C and 2D, at time tdoff the parasitic capacitance across the switch 22 is charged to a voltage (approximately equal to Vout) which is greater than Vin and a current flows in L1 owing to the reverse recovery of the diode 24.

After tdoff, with the switch 22 open and the diode non-conductive, energy stored in the resonant circuit formed by the circuit parasitic capacitances and inductor L1 causes oscillatory ringing in Iin and Vs. This oscillation (referred to herein as "parasitic oscillation" or simply "noise") is unrelated to the power conversion process. and may require that noise filtering components be added to the converter (not shown). In addition, closure of the switch 22 after tdoff will result in a wasteful loss of some or all of this energy ("switching loss").

By providing mechanisms for clamping the circuit voltages, the noise can be reduced or eliminated, and the stored energy can be trapped in an inductor and then released essentially losslessly back to the circuit. Generally, the capturing and later release of the energy is achieved by effectively shorting and then un-shorting the two ends of an inductor at controlled times.

Figure 3:
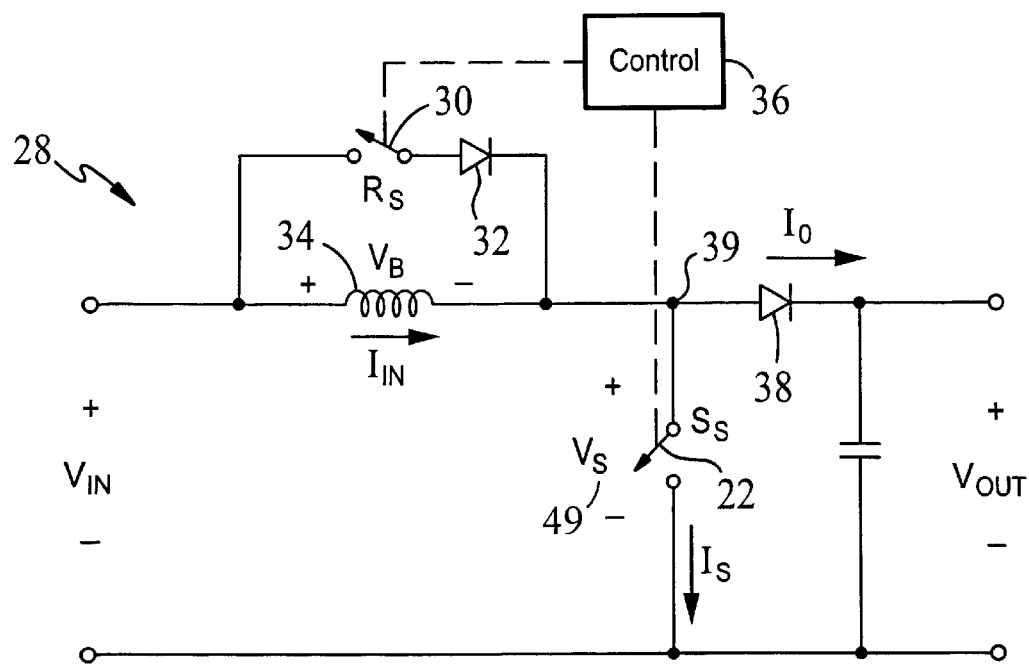
FIGS. 3, 5 and 6 show power conversion circuits with recovery switches.

As shown in FIG. 3, in one implementation, a unipolar, non-isolated, discontinuous boost converter circuit 28 includes a series circuit, comprising a recovery switch Rs 30 and a diode 32, that is connected across the ends of the inductor 34, and a controller 36 that regulates the on and off periods of both the recovery switch 30 and the shunt switch 22.

The recovery switch 30 is turned on and off in the following cycle. The switch may be turned on any time during the power delivery period 12 when the voltage across the inductor, VB (FIG. 3), is negative, because this will result in diode 32 being reverse biased. During the reverse recovery period, the diode 32 prevents the current that is flowing backward from the diode 38 from flowing in recovery switch 30. Instead, the reverse recovery energy is stored in the inductor.

After the diode snaps off, the energy stored in circuit parasitic capacitances will be exchanged with the inductor and the voltage, Vs, across shunt switch 22 will ring down. When the voltage Vs rings down to the input voltage, Vin, the voltage VB will equal zero, the recovery diode 32 will conduct and the recovery switch 30 and the diode 32 will short the ends of the inductor 34. In that state, the inductor 34 cannot exchange energy with any other circuit components. Therefore, the energy is "trapped" in the inductor and ringing in the main circuit is essentially eliminated.

Later, prior to the shunt switch being closed to start the shunt period, the recovery switch is opened. Because the current trapped in the inductor flows in the direction back toward the input source, opening the recovery switch 30 will result in an essentially lossless charging and discharging of parasitic circuit capacitances and a reduction in the voltage, Vs, across the shunt switch. By providing for a reduction in shunt switch voltage, Vs, the loss in the shunt switch associated with discharging of parasitics ("turn-on loss") can be reduced or, in certain cases, essentially eliminated.

Figure 4:
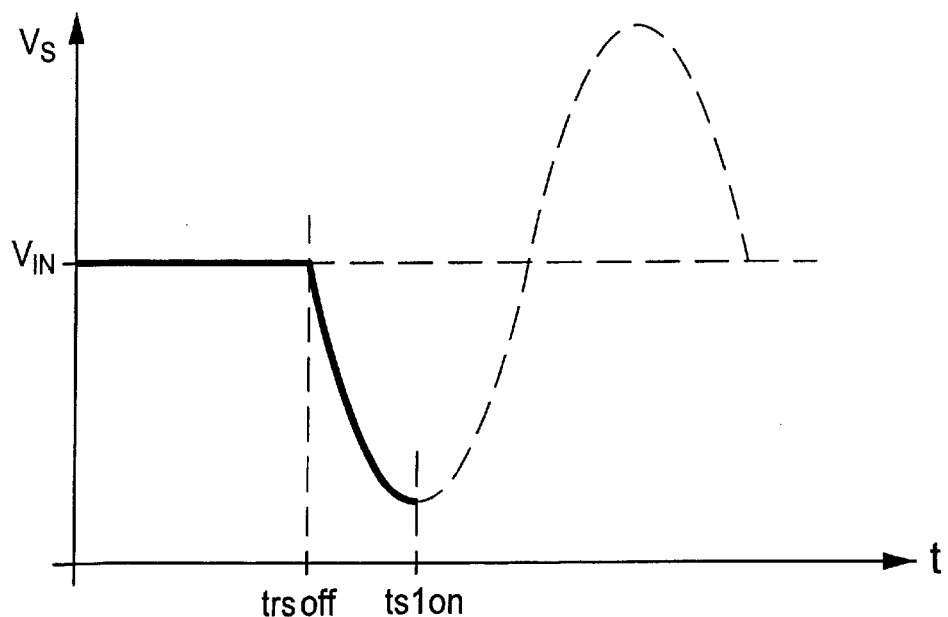
FIG. 4 shows a timing diagram.

As shown in FIG. 4, the delay between the opening of the recovery switch 30 and the closing of the shunt switch 22 may be adjusted so that the closure of the shunt switch corresponds in time to approximately the time of occurrence of the first minimum in the voltage Vs following the opening of the recovery switch at time trsoff (the dashed line in the Figure shows how the voltage Vs would continue to oscillate after ts1on if the shunt switch 22 were not turned on at that time). In cases where the voltage rings all the way down to zero (not shown in the Figure) the turn-on loss in the shunt switch can be essentially eliminated. Since capacitive energy is proportional to the square of the voltage, however, any amount of voltage reduction is important.

Figure 5:
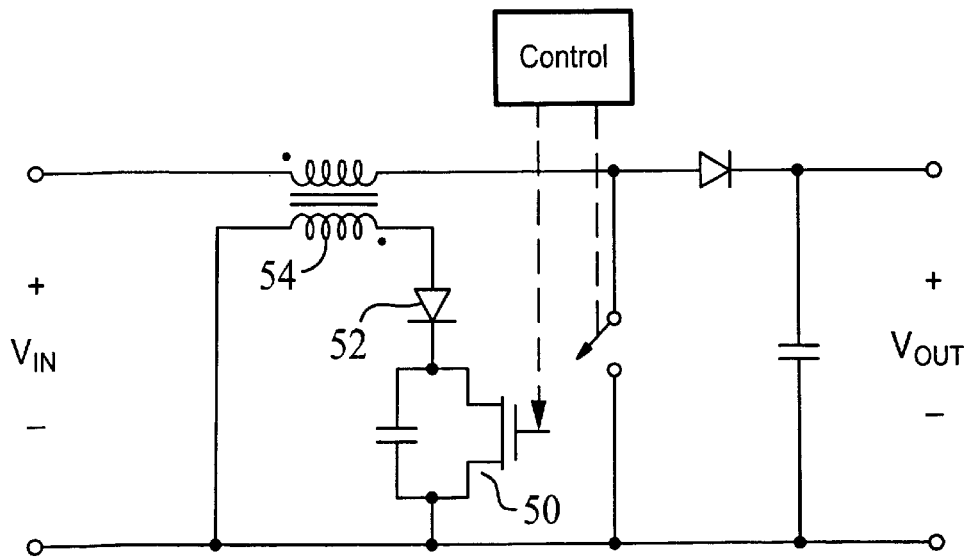

As shown in FIG. 5, in another approach, instead of wiring the recovery switch and diode directly across the inductor, a recovery switch 50 and a diode 52 are connected in series with a secondary winding 54 that is transformer-coupled to the inductor. The series circuit is connected to the ground side of the circuit for convenience in controlling the switch. The control switch may be implemented as a MOSFET in series with a diode. Turn-on losses will occur as a result of the body capacitor of the switch 50, but they are relatively small because the switch die is relatively small.

Figure 6:
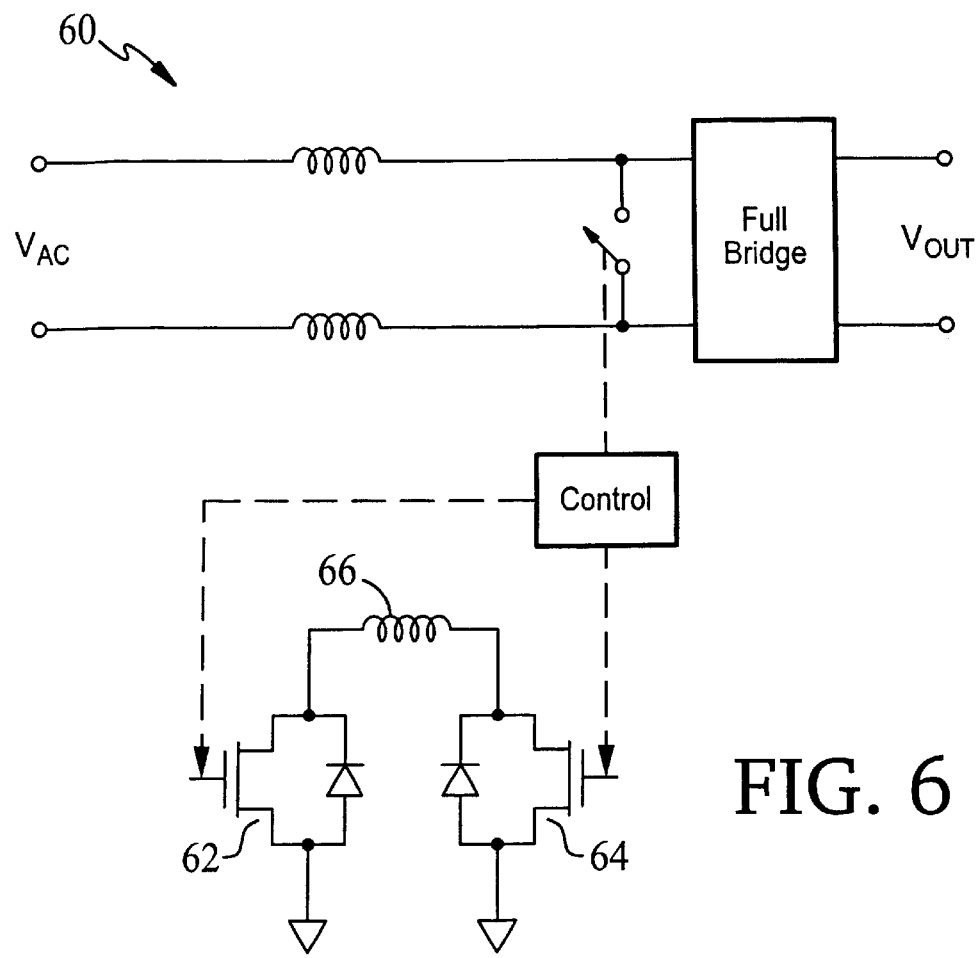

As shown in FIG. 6, in another implementation, a bipolar discontinuous boost converter 60 operating from a bipolar input source, Vac, uses the transformer-coupled switching technique of FIG. 5, but includes two recovery switches 62, 64 connected to respective ends of the winding 66. One of the recovery switches is always on for one polarity of input source Vac, and the other recovery switch is turned on and off using the same strategy as in FIG. 5. The scenario is reversed when the polarity of the input source reverses.

Care must be taken not to have the shunt switch and the recovery switch on at the same time, which would short-circuit the source.

The energy-trapping technique may be applied to any power converter, isolated or non-isolated, PWM or resonant, in which energy storage in inductive and capacitive circuit elements results in parasitic oscillations within the converter.

Figure 7:
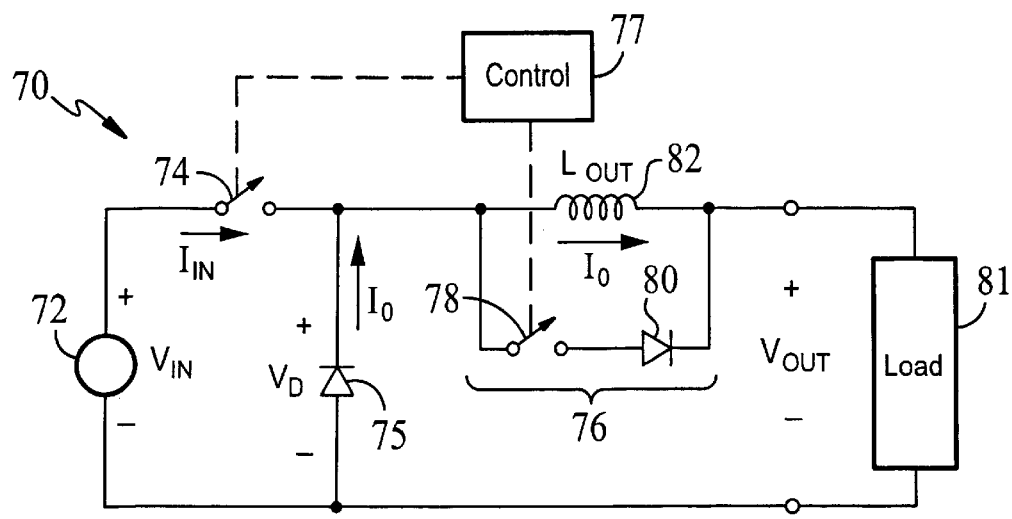
FIG. 7 shows a PWM, unipolar, isolated buck converter comprising a clamp circuit.

FIG. 7, for example, shows a PWM, unipolar, isolated buck converter 70 comprising a clamp circuit 76. In such a converter, the voltage delivered by the input source 72, Vin, is higher than the DC output voltage, Vout, delivered to the load 81. In a first part of a converter operating cycle, the switch 74 is closed and energy is delivered to the load from the input source 72 via the output inductor 82. In a second part of a converter operating cycle, the switch is open and energy stored in the inductor 82 flows as output current, Io, to the load via the diode 75. For load values above some lower limit, the output current, Io, flows continuously in the output inductor Lout 82. Below that lower limit, however, the instantaneous current in the output inductor 82 drops to zero and attempts to reverse. Under these circumstances the diode will block and, in the absence of the clamp circuit 76, an oscillation will begin as energy is transferred back and forth between the inductor 82 and circuit parasitic capacitances (e.g., the parasitic capacitances of the switch 74, the diode 75, the inductor 82 and the clamp circuit 76, not shown). Waveforms for the converter of FIG. 7, with the clamp circuit, are shown in FIGS. 8A and 8B.

Figure 8A:
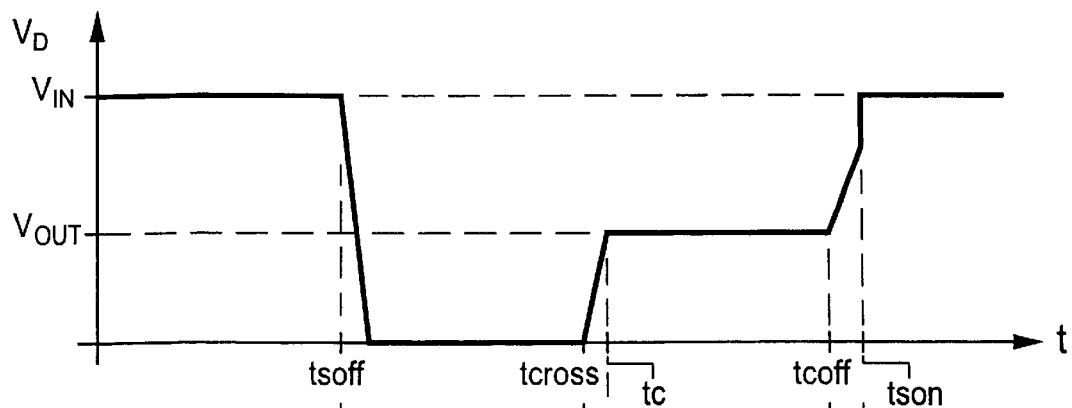
FIGS. 8A and 8B show waveforms for the converter of FIG. 7.
Figure 8B:
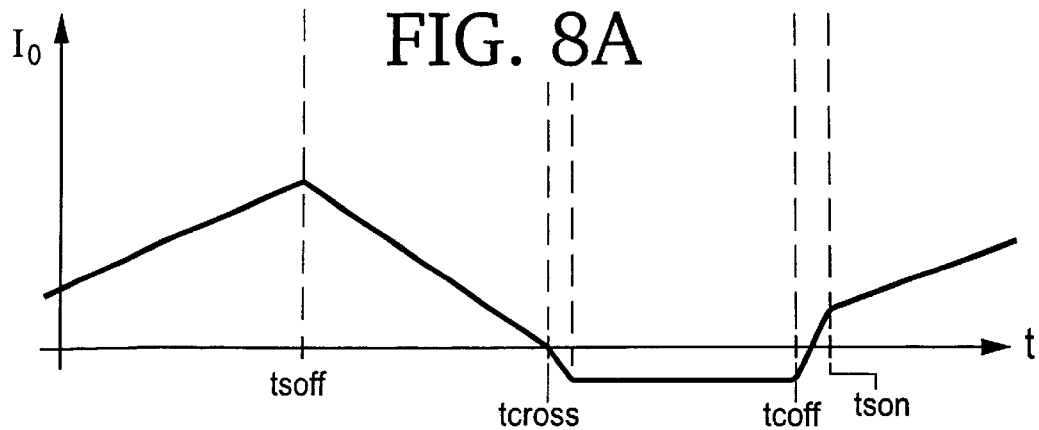

In FIGS. 8A and 8B, the switch 74 is on at time t=0, the voltage VD is approximately equal to Vin, and the current Io is increasing owing to the polarity of the voltage impressed across Lout. At time tsoff, switch 74 turns off and the voltage VD drops to essentially zero volts as the parasitic capacitances across the diode 75 are discharged and the diode conducts. The clamp switch 78 may be turned on any time after the voltage VD drops below Vout.

At time tcross the current Io declines to zero and attempts to reverse. After the diode 75 ceases conducting, the voltage VD rings up until the clamp diode 80 begins to conduct at time tc, when the voltage VD is approximately equal to Vout. Between times tc and tcoff the clamp circuit clamps the inductor and prevents parasitic oscillations. At time tcoff, the clamp switch is opened and the voltage VD rings up toward Vin. At time tson the switch 74 is closed, initiating another converter operating cycle. A switch controller 77 controls the relative timing of the two switches 74, 78. As for the timing discussed in FIG. 4, the delay between the opening of the clamp switch 78 and the closing of the switch 74 is adjusted so that the closure of switch 74 corresponds in time to approximately the time of occurrence of the first maximum in the voltage Vs following the opening of the clamp switch 78. This minimizes or eliminates the switching loss associated with closure of switch 74.

The transformer coupled clamp circuit of FIG. 5 may be used in the converter of FIG. 7.

Other embodiments are within the scope of the following claims.

For example, the technique may be applied to any switching power converter in which there is a time period during which undesired oscillations occur as a result of energy being transferred back and forth between unclamped inductive and capacitive energy storing elements.

Figure 9A:
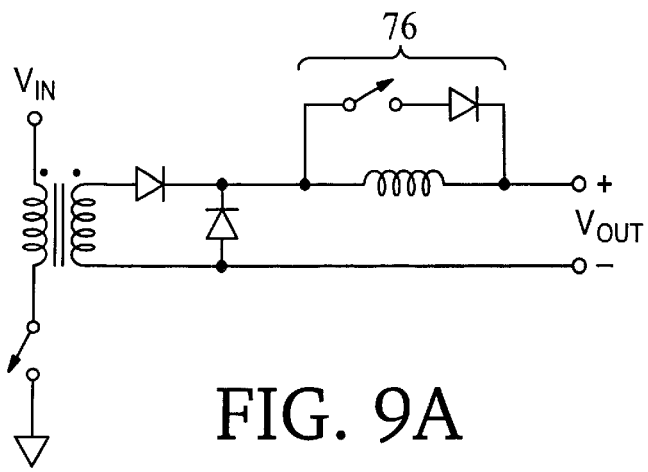
Figure 9B:
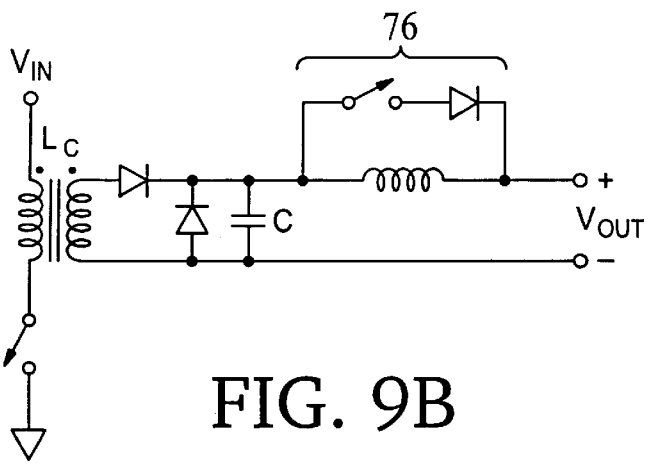
Figure 9C:
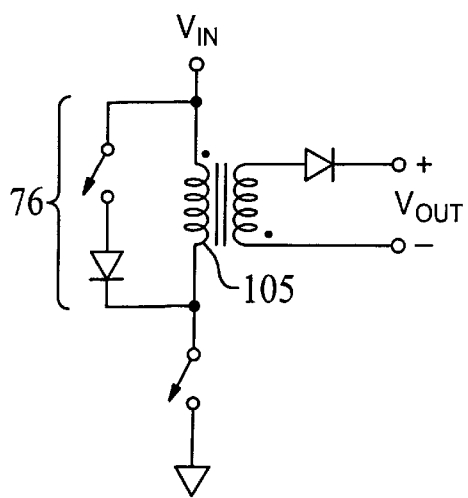
Figure 9D:
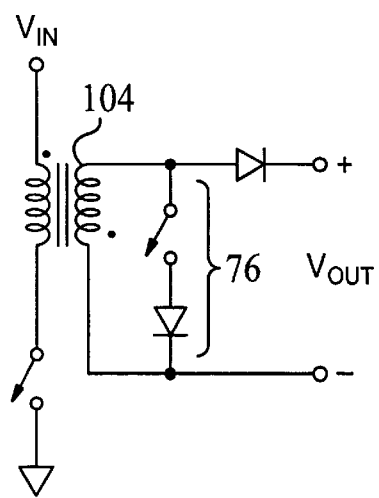

For example, FIGS. 9A through 9D show isolated, single-ended converters which comprise a clamp circuit 76 according to the invention. FIG. 9A is a unipolar, single-ended, forward PWM converter; FIG. 9B is a unipolar, single-ended, zero-current switching forward converter (as described in U.S. Pat. No. 4,415,959, incorporated by reference); FIG. 9C is a unipolar, single-ended, flyback converter with a clamp circuit 76 connected to the primary winding 105 of the flyback transformer; and FIG. 9D is a unipolar, single-ended, flyback converter with a clamp circuit 76 connected to the secondary winding 104 of the flyback transformer.

The clamp circuit may be modified to be of the magnetically coupled kind shown in FIG. 5, above. Other topologies to which the technique may be applied include resonant and quasi-resonant non-isolated, boost, buck and buck-boost converters. By use of bipolar clamp circuitry of FIG. 6, or equivalent circuitry, the technique may be applied to bipolar equivalents of unipolar PWM, resonant and quasi-resonant non-isolated, boost, buck and buck-boost converters.

What is claimed is:

1. Apparatus comprising
   switching power conversion apparatus for converting power from an input source for delivery to a load comprising an inductive element connected to deliver energy via a unidirectional conducting device from said input source to said load during a succession of power conversion cycles,
   circuit capacitance which can resonate with said inductive element during a portion of said power conversion cycle to cause a parasitic oscillation unrelated to the power conversion process, and
   clamp circuitry configured to trap energy in the inductive element and prevent said parasitic oscillation.

2. The apparatus of claim 1 wherein said power conversion apparatus is a unipolar, non-isolated boost converter comprising a shunt switch.

3. The apparatus of claim 2 in which the shunt switch is controlled to cause the power conversion to occur in a discontinuous mode.

4. The apparatus of claim 1 in which the clamp circuitry is configured to trap the energy in the inductor in a manner that is essentially non-dissipative.

5. The apparatus of claim 1 in which the clamp circuitry comprises elements configured to trap the energy by short-circuiting the inductor during a controlled time period.

6. The apparatus of claim 1 in which the inductive element comprises a choke.

7. The apparatus of claim 1 in which the inductive element comprises a transformer.

8. The apparatus of claim 5 in which the elements comprise a second switch connected effectively in parallel with the inductor.

9. The apparatus of claim 8 in which the second switch is connected directly in parallel with the inductor.

10. The apparatus of claim 8 in which the second switch is inductively coupled in parallel with the inductor.

11. The apparatus of claim 8 in which the second switch comprises a field effect transistor in series with a diode.

12. The apparatus of claim 8 wherein said power conversion apparatus is a unipolar, non-isolated boost converter comprising a shunt switch and a switch controller, said switch controller controlling the timing of a power delivery period during which said shunt switch is open and a shunt period during which said shunt switch is closed.

13. The apparatus of claim 12 in which the shunt switch is controlled to cause the power conversion to occur in a discontinuous mode.

14. The apparatus of claim 12 in which the second switch is opened for a period before the shunt switch is closed in order to discharge parasitic capacitances in the apparatus.

15. The apparatus of claim 1 wherein said power conversion apparatus is a unipolar, isolated, single-ended forward converter.

16. The apparatus of claim 15 wherein said power conversion apparatus is a buck converter.

17. The apparatus of claim 15 wherein said power conversion apparatus is a flyback converter.

18. The apparatus of claim 15 wherein said single-ended forward converter is a zero-current switching converter.

19. The apparatus of claim 15 wherein said single-ended forward converter is a PWM converter.

20. The apparatus of claim 1 wherein said power conversion apparatus is a bipolar, non-isolated, boost converter.

21. The apparatus of claim 1 wherein said power conversion apparatus is a bipolar, non-isolated boost converter.

22. The apparatus of claim 1 wherein said power conversion apparatus is a bipolar, non-isolated buck converter.

23. The apparatus of claim 1 wherein said power conversion apparatus is a bipolar, isolated boost converter.

24. The apparatus of claim 1 wherein said power conversion apparatus is a bipolar, isolated buck converter.

25. In a power converter which converts power from an input source for delivery to a load during a succession of power conversion cycles and which comprises an inductive element connected to deliver power via a unidirectional conducting device from said input source to said load and a circuit capacitance which can resonate with said inductive element during a portion of said power conversion cycle to cause a parasitic oscillation unrelated to the power conversion process,
   a method for preventing said parasitic oscillations comprising
   providing clamp circuitry for trapping energy in the inductive element during a portion of the power conversion cycle.

26. The method of claim 25 also including releasing the energy from the inductor essentially non-dissipatively.

27. The method of claim 17 wherein the trapping of energy comprises short-circuiting the inductive element during a controlled time period.

28. The method of claim 27 in which the short-circuiting is done by a second switch connected effectively in parallel with the inductive element.

29. The apparatus of claim 28 also including opening the second switch for a portion of the power conversion cycle in order to discharge parasitic capacitances.

* * * * *